(12) United States Patent
Mohalley et al.

(10) Patent No.: US 10,635,070 B2
(45) Date of Patent: Apr. 28, 2020

(54) SYSTEMS AND METHODS FOR PROGRAMMING A MOTOR

(71) Applicant: Regal Beloit America, Inc., Beloit, WI (US)

(72) Inventors: Christopher Allen Mohalley, Racine, WI (US); Bryan James Stout, Fort Wayne, IN (US); Harry Robert Wilson, Auburn, IN (US); Ryan Keith Stephens, Fort Wayne, IN (US); Gregory Paul Sullivan, Fort Wayne, IN (US)

(73) Assignee: Regal Beloit America, Inc., Beloit, WI (US)

( * ) Notice: Subject to any disclaimer, the term of this patent is extended or adjusted under 35 U.S.C. 154(b) by 479 days.

(21) Appl. No.: 15/441,334

(22) Filed: Feb. 24, 2017

(65) Prior Publication Data

US 2018/0246485 A1 Aug. 30, 2018

(51) Int. Cl.
*H02K 11/00* (2016.01)
*G05B 19/042* (2006.01)
*H02K 11/33* (2016.01)
*H02K 5/22* (2006.01)

(52) U.S. Cl.
CPC ......... *G05B 19/0426* (2013.01); *H02K 11/33* (2016.01); *H02K 5/225* (2013.01)

(58) Field of Classification Search
CPC ..... G05B 19/0426; H02K 11/33; H02K 5/225
See application file for complete search history.

(56) References Cited

U.S. PATENT DOCUMENTS

| 8,063,593 | B2 | 11/2011 | Mullin |
| 2014/0079564 | A1 | 3/2014 | Becerra et al. |
| 2015/0296050 | A1* | 10/2015 | Bomkamp ............... H04L 67/12 |
| | | | 709/217 |

* cited by examiner

*Primary Examiner* — Muhammad S Islam
(74) *Attorney, Agent, or Firm* — Armstrong Teasdale LLP (57) ABSTRACT

A programming module, systems, and methods for programming a motor controller coupled to a motor are provided. The programming module includes a connector for coupling to a system control wire harness of a system control board and a wire harness for coupling to a motor connector of the motor controller such that the programming module is serially coupled between the system control board and the motor controller. The module also includes a tap detection circuit coupled to the connector for detecting which tap of a plurality of motor taps is called by the system control board. A wireless communication device is configured to transmit an identification of the called tap wirelessly to a programming computing device, receive an adjusted operating parameter for the motor that is associated with the called tap from the programming computing device, and transmit, via the wire harness, the adjusted operating parameter to the motor controller.

20 Claims, 5 Drawing Sheets

SYSTEMS AND METHODS FOR PROGRAMMING A MOTOR

BACKGROUND

The embodiments described herein relate generally to motors, and more particularly, to systems and methods for programming a motor.

Motors used in heating, ventilation, air conditioning (HVAC) and fluid circulation systems often must be programmed to operate according to the specific needs of their systems and must be diagnosed when they do not operate properly. Currently, the motors are programmed using a specialized motor programming computer at a motor manufacturing facility, at the point of sale, or at an assembly plant. Programming a motor that is already onsite requires a technician to return the motor to the motor manufacturing facility or to another designated programming site that has the specialized motor programming computer. Similarly, motors at inventory sites that do not have a specialized motor programming computer must be sent back to the motor manufacturing facility to be programmed for their selected applications.

Motors also occasionally have to be replaced with new motors when they malfunction or otherwise quit working properly. Because motors are made in a variety of sizes and ratings, an onsite technician must stock many types of motors to ensure the correct motor for the job is available. Otherwise, the technician must return to the inventory site to obtain the correct motor. This becomes very time consuming and costly over time considering the wide range of motor systems each requiring specific motor operating parameters. In addition, a technician must carry many motor diagnostic tools and adaptors for interfacing with and servicing the different motors.

BRIEF DESCRIPTION

In one aspect, a programming module is provided. The programming module includes a connector for coupling to a system control wire harness of a system control board and a wire harness for coupling to a motor connector of the motor controller such that the programming module is serially coupled between the system control board and the motor controller. The module also includes a tap detection circuit coupled to the connector for detecting which tap of a plurality of motor taps is called by the system control board. A wireless communication device is configured to transmit an identification of the called tap wirelessly to a programming computing device, receive an adjusted operating parameter for the motor that is associated with the called tap from the programming computing device, and transmit, via the wire harness, the adjusted operating parameter to the motor controller.

In another aspect, a method of programming a motor controller coupled to a motor is provided. The method includes coupling a connector of a programming module to a system control wire harness of a system control board and coupling a wire harness of the programming module to a motor connector of the motor controller such that the programming module is serially coupled between the system control board and the motor controller. The method also includes detecting, using a tap detection circuit of the programming module which tap of a plurality of taps of the motor is called by the system control board and transmitting, by a wireless communication device, an identification of the called tap wirelessly to a programming computing device. The method further includes receiving, from the programming computing device, an adjusted operating parameter for the motor that is associated with the called tap, and transmitting, via the wire harness, the adjusted operating parameter to the motor controller.

In a further aspect, a motor programming system for programming a motor controller coupled to a motor is provided. The system includes a programming module for programming a motor controller coupled to a motor. The programming module includes a connector configured to be coupled to a system control wire harness of a system control board and a wire harness configured to be coupled to a motor connector of the motor controller such that the programming module is serially coupled between the system control board and the motor controller. The programming module also includes a tap detection circuit coupled to said connector and configured to detect which tap of a plurality of taps of the motor is called by the system control board, and a wireless communication device. The wireless communication device is configured to wirelessly transmit an identification of the called tap, receive an adjusted operating parameter for the motor that is associated with the called tap, and transmit, via the wire harness, the adjusted operating parameter to the motor controller. The system also includes a programming computing device coupled in wireless communication to the programming module and configured to receive an adjusted operating parameter input by a user that associated with the called tap, and wirelessly transmit the adjusted operating parameter to the programming module.

DETAILED DESCRIPTION

Figure 1:
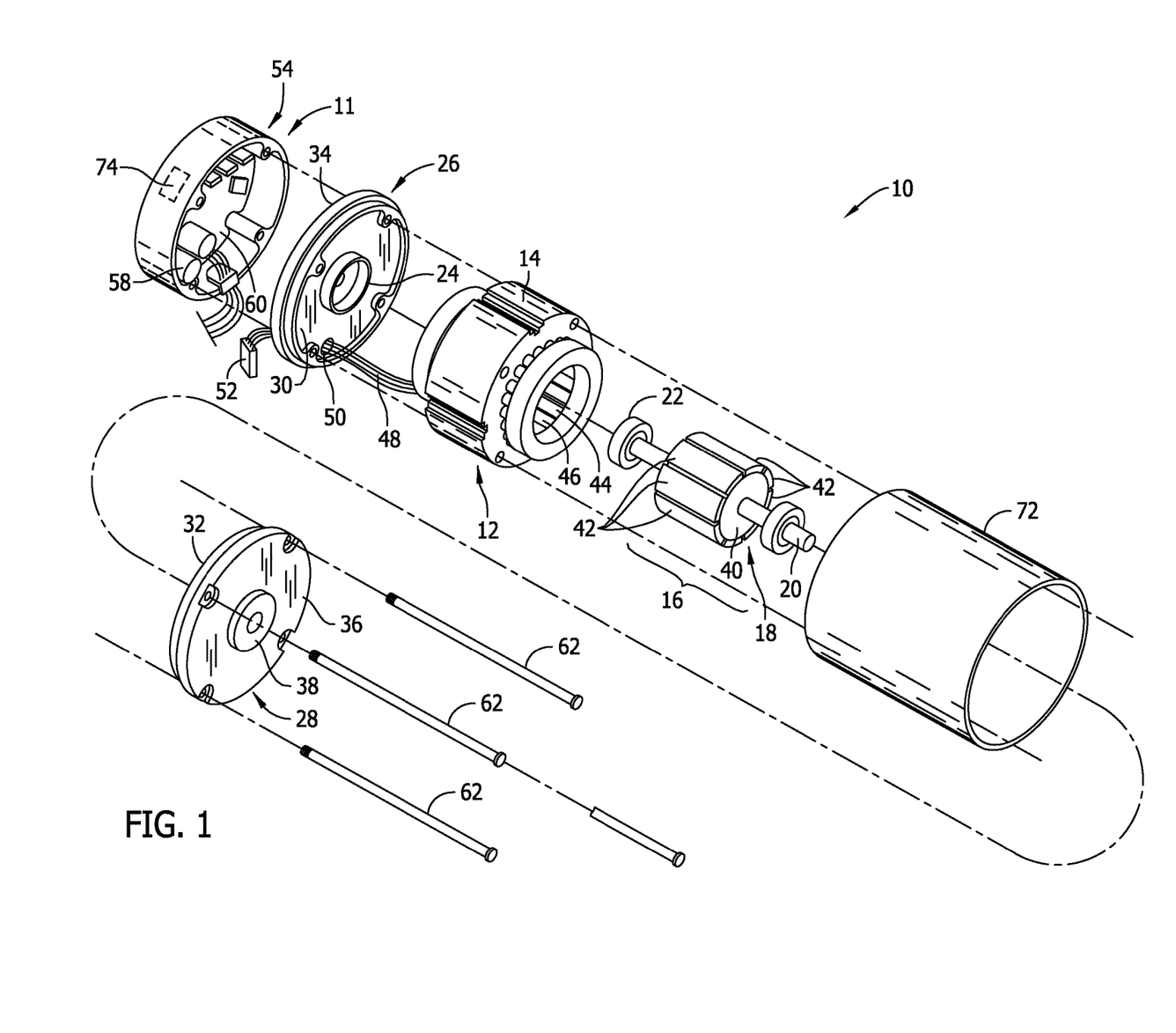
FIG. 1 is an exploded view of an exemplary motor.

FIG. 1 is an exploded view of an exemplary motor 10. Motor 10 includes a stationary assembly 12 including a stator or core 14 and a rotatable assembly 16 including a permanent magnet rotor 18 and a shaft 20. In the exemplary embodiment, motor 10 is used in a heating, ventilating and air conditioning system (not shown).

Rotor 18 is mounted on and keyed to shaft 20 for rotation within conventional bearings 22. Bearings 22 are mounted in bearing supports 24 integral with a first end member 26 and a second end member 28. First end member 26 has an inner facing side 30 and an outer side 34. Second end member 28 has an inner facing side 32 and an outer side 36. Outer sides 34 and 36 are opposite inner sides 30 and 32 respectively. Stationary assembly 12 and rotatable assembly 16 are located between sides 30 and 32. Additionally, second end member 28 includes an aperture 38 for shaft 20 to extend through outer side 34.

Rotor 18 comprises a ferromagnetic core 40 and is rotatable within stator 14. Segments 42 of permanent magnet material, each providing a relatively constant flux field, are secured, for example, by adhesive bonding to rotor core 40. Segments 42 are magnetized to be polarized radially in relation to rotor core 40 with adjacent segments 42 being alternately polarized as indicated. While magnets on rotor 18 are illustrated for purposes of disclosure, it is contemplated that other rotors having different constructions and other magnets different in both number and construction, and flux fields may be utilized with such other rotors within the scope of the invention.

Stationary assembly 12 comprises a plurality of windings 44 adapted to be electrically energized to generate an electromagnetic field. Windings 44 are coils of wire wound around teeth 46 of laminated stator core 14. Winding terminal leads 48 are brought out through an aperture 50 in first end member 26 terminating in a connector 52. While stationary assembly 12 is illustrated for purposes of disclosure, it is contemplated that other stationary assemblies of various other constructions having different shapes and with different number of teeth may be utilized within the scope of the invention.

Motor 10 may include any even number of rotor poles and the number of stator poles are a multiple of the number of rotor poles. For example, the number of stator poles may be based on the number of phases.

Motor 10 further includes an enclosure 54 which mounts on the rear portion of motor 10. A motor controller 11 includes a plurality of electronic components 58 and a connector (not shown) mounted on a component board 60, such as a printed circuit board. Motor controller 11 is connected to winding stages 44 by interconnecting connector 52. Motor controller 11 applies a current to one or more of winding stages 44 at a time for commutating windings 44 in a preselected sequence to rotate rotatable assembly 16 about an axis of rotation.

A housing 72 is positioned between first end member 26 and second end member 28 to facilitate enclosing and protecting stationary assembly 12 and rotatable assembly 16.

Figure 2:
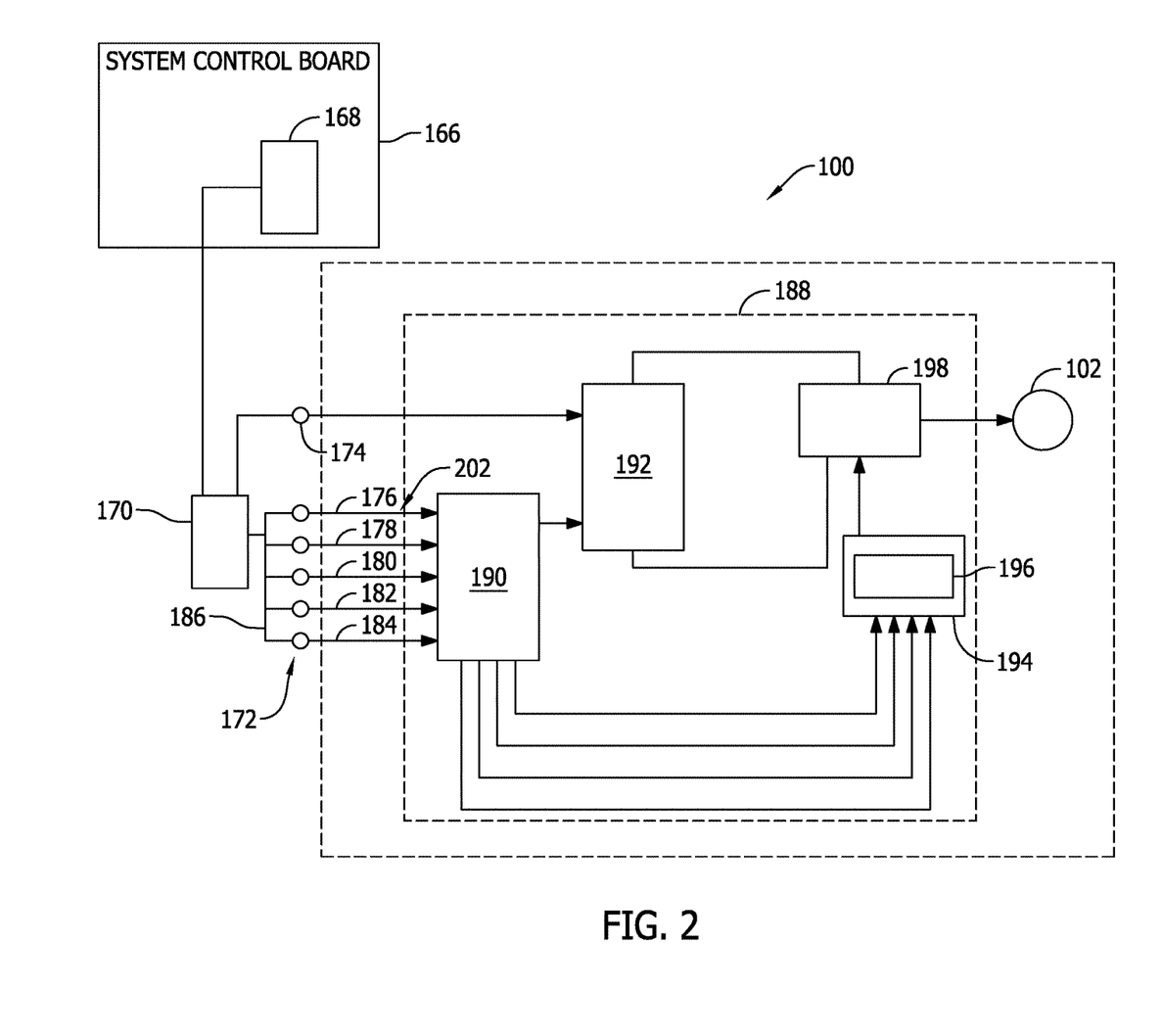
FIG. 2 is a schematic diagram of a motor system for controlling a motor.

FIG. 2 is a schematic diagram of a motor system 100 for controlling a motor 102, which may be similar to motor 10 (shown in FIG. 1). In the exemplary embodiment, motor 102 is utilized as a fan and/or blower motor in a heating, ventilation, and air conditioning (HVAC) system. Alternatively, motor 102 may be implemented in any application that enables electric motor controller 188 to function as described herein, including, but not limited to, a fluid (e.g., water, air, etc.) moving system, a clean room filtering system, a fan filter unit, a variable air volume system, a refrigeration system, a furnace system, and/or an air conditioning system.

In the exemplary embodiment, motor system 100 includes a motor controller 188 coupled between motor 102 and a system control board 166. System control board 166 includes a power source 168 and an HVAC system controller 170, or the like. Power source 168 is configured to transmit AC power/signals such as, but not limited to, high and/or low voltages. HVAC system controller 170 is coupled to power source 168, which is also connected to one or more of input taps 172 and a power terminal 174. In the exemplary embodiment, the plurality of input taps 172 includes a first input tap 176, a second input tap 178, a third input tap 180, a fourth input tap 182 and a fifth input tap 184. Alternatively, the plurality of input taps 172 may include any number of input taps 172 to enable motor to function as described herein. Based on user settings and a temperature measured by, HVAC system controller 170, system control board 166 causes one of input taps 172 to close to command motor 102 to operate at a desired operating parameter.

Power source 168 transmits a voltage, for example, between about 100 V and about 250 V, to the plurality of input taps 172. The plurality of input taps 172 are coupled to a motor wire connector of motor 102 (e.g., via individual wires, via a plug/socket arrangement, or otherwise). Moreover, the plurality of input taps 172 may be coupled to power source 168 in response to control signals from a thermostat (not shown) (e.g., wherein the thermostat opens or closes relays between power source 168 and the plurality of input taps 172).

Motor system 100 further includes a motor controller 188 coupled to the plurality of input taps 172 and power terminal 174. Motor controller 188 includes a tap detection circuit 190, a rectifier 192, a processor 194 having a memory 196 and a switch driver 198. Tap detection circuit 190 is configured to detect which of the plurality of input taps 172 has been activated by system control board 166. Rectifier 192 is coupled to switch driver 198 and is configured to convert AC power signal of power source 168 to a DC power signal, wherein the DC power signal is supplied to switch driver 198. Switch driver 198 is coupled to motor 102 using a wire harness, as is known in the art. Moreover, processor 194 is coupled to switch driver 198, wherein memory 196 includes operating instructions for operating motor 102. In the exemplary embodiment, operating instructions include at least one of a predetermined speed, direction of rotation, torque and horsepower.

Processor 194 is programmable so that the operating instructions of motor 102 may be changed and/or overridden by the technician based on information presented to installer by at least one of an operating manual (not shown), a look up table (not shown) and application operation instructions (not shown). Any information can be used to change/override input condition 200 to enable motor 102 to function as described herein. More particularly, the technician may selectively energize at least one input tap 204 of the plurality of input taps 172 to command motor 102 to perform a function to change an operating instruction.

Motor controller 188 controls motor 102 by transmitting a command signal to components of motor 102. In the exemplary embodiment, the command signal is one or more high-voltage and high frequency pulses. Motor controller 188 includes at least one memory device 196 and a processor 194 that is communicatively coupled to memory device 196 for executing instructions. In one embodiment, memory device 196 and processor 194 are integrated into a single unit. In some embodiments, executable instructions are stored in memory device 196. In the exemplary embodiment, motor controller 188 performs one or more operations described herein by programming processor 194. For example, processor 194 may be programmed by encoding an operation as one or more executable instructions and by providing the executable instructions in memory device 196. Motor controller 188 also includes an input/output unit 208 that enables input and output of data with other components within motor 102 and/or devices that may be connected to motor controller 188. In one embodiment, input/output unit 208 may provide a connection that enables user input to be transmitted and/or received through a user input device (not shown).

In the exemplary embodiment, memory device 196 is one or more devices that enable information such as executable instructions and/or other data to be stored and retrieved. Memory device 196 may include one or more computer readable media, such as, without limitation, dynamic random access memory (DRAM), static random access memory (SRAM), a solid state disk, and/or a hard disk.

Memory device 196 may be configured to store, without limitation, application source code, application object code, source code portions of interest, object code portions of interest, configuration data, execution events and/or any other type of data. In the exemplary embodiment, memory device 196 includes firmware and/or initial configuration data for motor controller 188.

Processor 194 may include one or more processing units (e.g., in a multi-core configuration). Further, processor 194 may be implemented using one or more heterogeneous processor systems in which a main processor is present with secondary processors on a single chip. Alternatively, processor 194 may be a symmetric multi-processor system containing multiple processors of the same type. Further, processor 194 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein. In the exemplary embodiment, processor 194 controls operation of motor controller 188.

Figure 3:
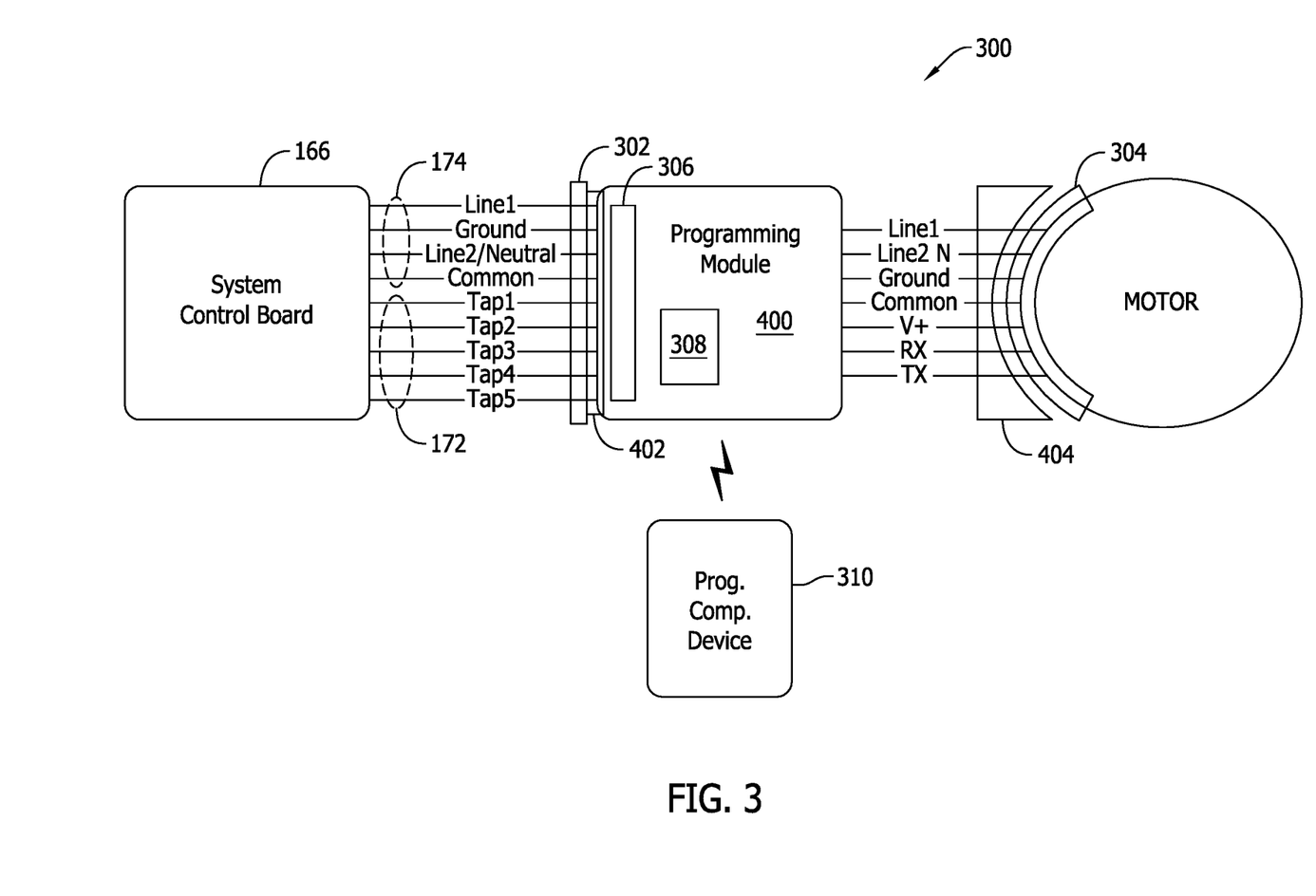
FIG. 3 is a block diagram of a motor programming system that may be used to program the motor shown in FIG. 2.
Figure 4:
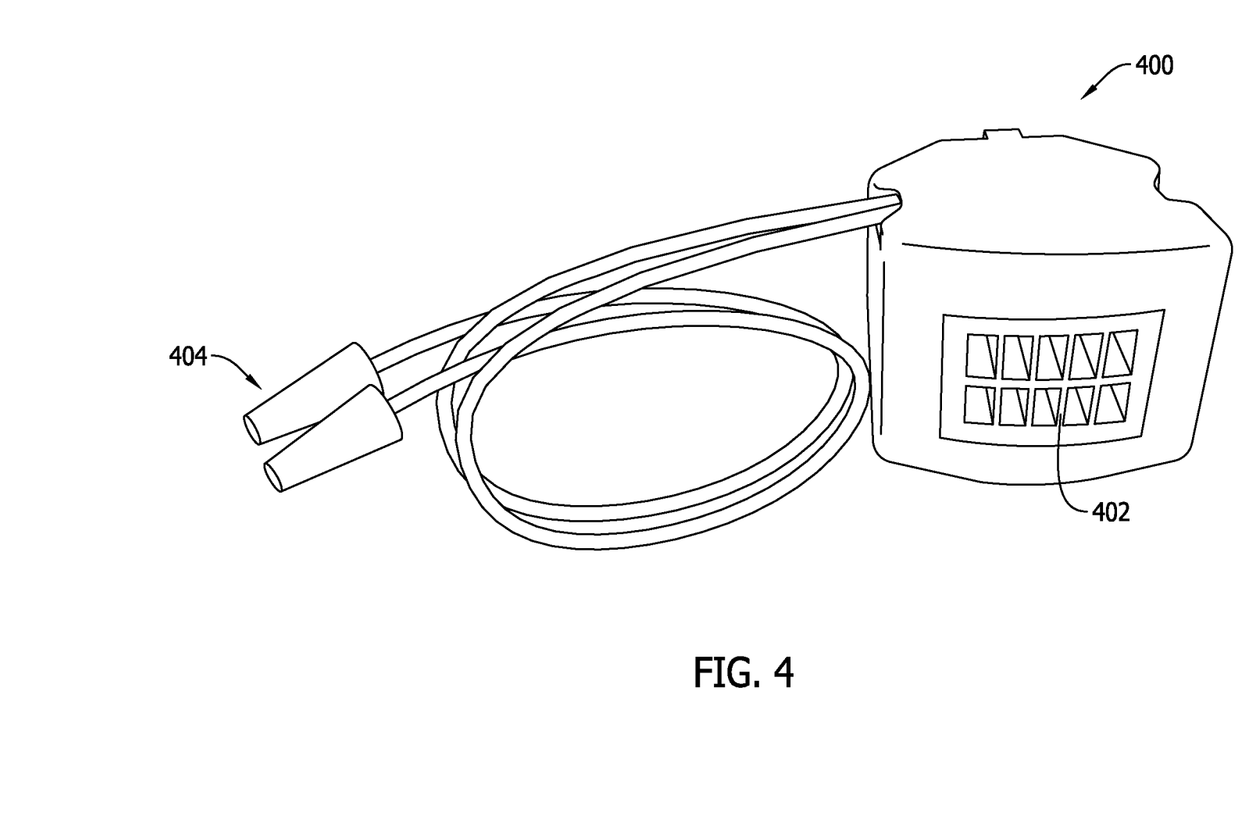
FIG. 4 is a schematic diagram of an exemplary programming module that may be used with the motor programming system shown in FIG. 3.

FIG. 3 is a block diagram of a motor programming system 300 that may be used to program a motor, such as motor 102, shown in FIG. 2. FIG. 4 is a schematic diagram of an exemplary programming module 400 that may be used with motor programming system 300 (shown in FIG. 3).

In the exemplary embodiment, motor programming system 300 includes programming module 400 that is configured to be coupled between a system control board 166 and motor 102. Programming module 400 includes a connector 402 for coupling to system control board 166 and a wire harness 404 for coupling to motor 102. More specifically, system control board 166 includes a system control wire harness 302 that, during normal operation of motor 102, is configured to be connected to a motor connector 304 onboard motor 102. In the exemplary embodiment, system control wire harness 302 is configured to be connected to connector 402 of programming module 400. System control wire harness 302 includes power line terminals 174 (shown in FIG. 2) and a plurality of input taps 172 (shown in FIG. 2). Wire harness 404 of programming module 400 is configured to be connected to motor connector 304 onboard motor 102 such that programming module 400 is coupled serially between system control board 166 and motor 102. Wire harness 404 includes identical terminals as system control wire harness 302 and their description is not repeated herein.

In the exemplary embodiment, programming module 400 includes a tap detection circuit 306 and a wireless communication device 308. Programming module 400 is powered via input taps 402 associated with programming module 400. Alternatively, programming module 400 may be powered by an internal battery, by line voltage from power source 168, and/or any other power source that enables programming module 400 to function as described herein. Programming module 400 is a transitory device that enables substantially real-time adjustment of motor operational parameters, which are programmed into a non-volatile memory of motor 102.

Tap detection circuit 306 is coupled to connector 402 and receives a signal indicating a calling of one of input taps 172. Tap detection circuit 306 is configured to determine which specific tap 172 is called by system control board 166 using known tap detection methods. Tap detection circuit 306 then transmits a determined called tap 172 to wireless communication device 308.

Wireless communication device 308 receives the determined tap calls from system control board 166 and wirelessly transmits them to a programming computing device 310. In the exemplary embodiment, wireless communication device 308 is a transceiver, but may include any other type of known wireless communications device that enables programming module 400 to function as described herein. Wireless communication device 308 is configured to wirelessly couple to programming computing device 310 using a point-to-point wireless connection, but may alternatively use any other type of known wireless connection that enables programming system 300 to function as described herein.

Using an application implemented on programming computing device 310, the technician is able to view the tap call and adjust operating parameters of motor 102 associated with each tap 172 as desired in substantially real time, as described in more detail herein. Programming computing device 310 is configured to implement a mobile application stored on a non-transitory computer-readable medium of said programming computing device. The mobile application includes a graphical user interface for inputting motor programming instructions therein to adjust the operating parameter.

Wireless communication device 308 receives adjusted operating parameters transmitted from programming computing device 310 and communicates the adjusted operating parameters to processor 194 (shown in FIG. 2) for storage on memory device 196 (shown in FIG. 2). Adjustable operating parameters include, but are not limited to, torque, speed, airflow, voltage, current, on-delay, off-delay, slew rate, rotation, and/or motor response timing.

In one embodiment, programming module 400 may be coupled to and program motor 102 without being coupled to system control board 166. If the technician knows the desired operating parameters for motor 102 for the particular system in which it is installed or will be installed, the technician may couple programming module 400 to motor 102 and use programming computing device 310 to input the desired operating parameters. This may be accomplished without having to operate motor 102 and/or without having inputs to the motor control taps.

In another embodiment, the technician or installer may install multiple motors into multiple units of the same type at one worksite. After connecting and programming a first motor 102 to programming module 400 and system control board 166, the technician may determine the desired operating parameters for motor 102. Because the other motors are being installed in the same type of units at the same worksite, the same operating parameters may be for all motors 102. The technician may couple programming module 400 to each additional motor 102 before their installation and program them with the desired operating parameters determined for the first motor 102 using programming computing device 310. This may be referred to as programming a motor "on the bench" and facilitates reducing the time associated with installing and programming multiple motors.

Figure 5:
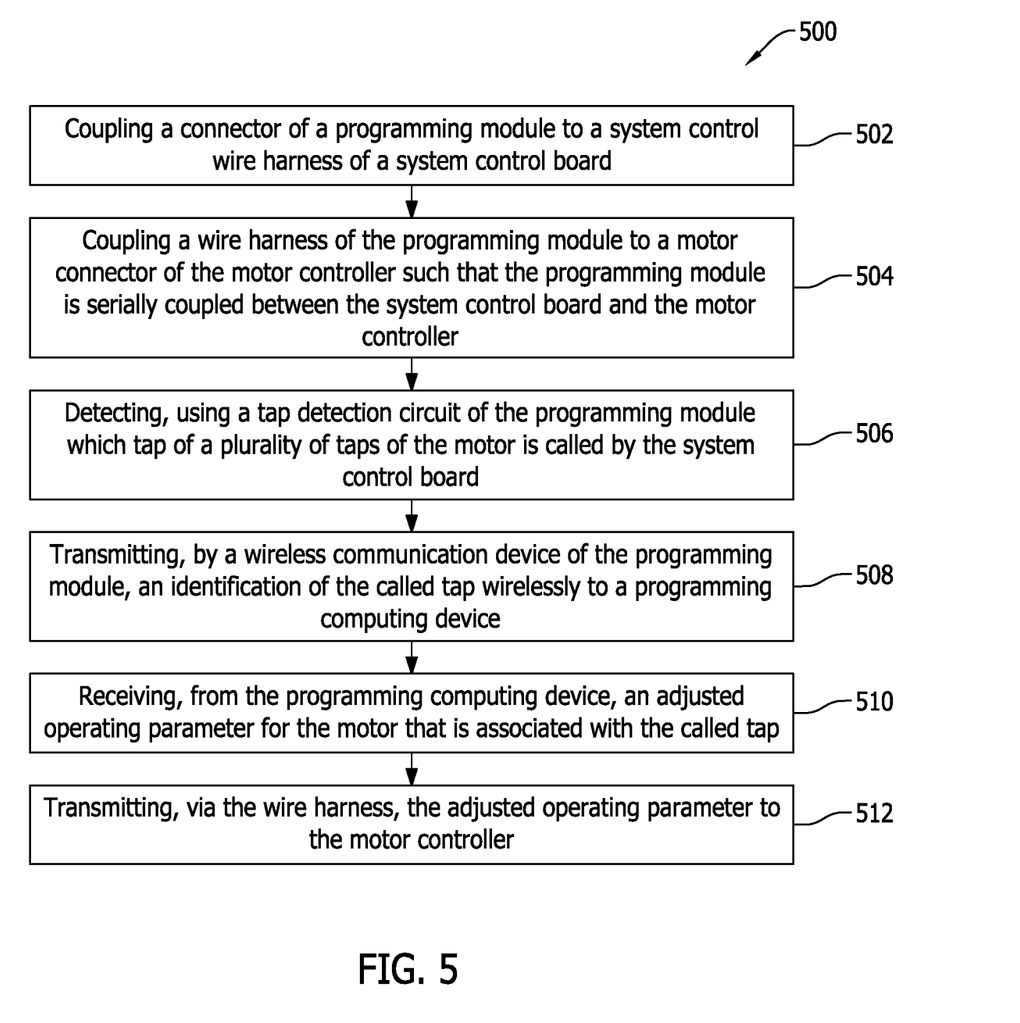
FIG. 5 is a flowchart of an exemplary method of programming a motor using the motor programming system shown in FIG. 3.

FIG. 5 is a flowchart of an exemplary method 500 of programming a motor using motor programming system 300 (shown in FIG. 3).

Initially, method 500 includes coupling 502 a connector of a programming module to a system control wire harness of a system control board. The connector may include a plurality of power line terminals for receiving power from a system control board, and a plurality of input tap terminals, each associated with a respective system control board operating instruction.

Method 500 also includes coupling 504 a wire harness of the programming module to a motor connector of the motor controller such that the programming module is serially coupled between the system control board and the motor controller. The wire harness includes a plurality of power line terminals for providing power from the system control board to the motor via the programming module, and a plurality of taps terminals, each associated with a respective system control board operating instruction, each of the plurality of taps terminals configured to provide a respective adjusted operating parameter to the motor controller.

Method 500 also includes detecting 506, using a tap detection circuit of the programming module which tap of a plurality of taps of the motor is called by the system control board.

Method 500 also includes transmitting 508, by a wireless communication device of the programming module, an identification of the called tap wirelessly to a programming computing device.

Method 500 also includes receiving 510, from the programming computing device, an adjusted operating parameter for the motor that is associated with the called tap. This may include receiving an adjustment of at least one of torque, speed, airflow, voltage, current, on-delay, off-delay, slew rate, rotation, and motor response timing.

Method 500 further includes transmitting 512, via the wire harness, the adjusted operating parameter to the motor controller.

In one embodiment, method 500 may include wirelessly coupling the wireless communication device to the programming computing device using a point-to-point wireless connection.

In another embodiment, method 500 may include generating, by the system control board, a specific tap call that requires the motor to operate.

In another embodiment, method 500 may include displaying the called tap and at least one operating parameter of the motor associated with the called tap on a mobile application provided on the programming computing device.

In another embodiment, wherein before coupling the connector to the system control wire harness and coupling the wire harness to the motor connector, method 500 may include disconnecting the system control wire harness from the motor connector of the motor.

The embodiments described herein provide a programming module, systems, and methods for programming a motor controller that is coupled to a motor. The embodiments facilitate detecting a tap called by a system control board, adjusting an operating parameter associated with the called tap, and storing the adjusted operating parameter in the motor controller in substantially real-time while the motor is operating. The programming module is plugged in between the system control board and the motor controller, and a mobile application on a programming computing device wirelessly communicates with the programming module to receive the tap calls, enable a user to adjust the operating parameter, and provide the adjusted operating parameter to the motor controller via the programming module. The programming module is a cost-effective solution to programming motors and is removable after programming, so that the user may program numerous motors using the same programming module.

Exemplary embodiments of the control system and methods of programming an electric motor are described above in detail. The control system and methods are not limited to the specific embodiments described herein, but rather, components of the control system and/or the motor and/or steps of the method may be utilized independently and separately from other components and/or steps described herein. For example, the control system and methods may also be used in combination with other power systems and methods, and are not limited to practice with only the HVAC system as described herein. Rather, the exemplary embodiments can be implemented and utilized in connection with many other system applications or other support.

A technical effect of the system described herein includes at least one of: a) coupling a connector of a programming module to a system control wire harness of a system control board; (b) coupling a wire harness of the programming module to a motor connector of the motor controller such that the programming module is serially coupled between the system control board and the motor controller; (c) detecting, using a tap detection circuit of the programming module which tap of a plurality of taps of the motor is called by the system control board; (d) transmitting, by a wireless communication device of the programming module, an identification of the called tap wirelessly to a programming computing device; (e) receiving, from the programming computing device, an adjusted operating parameter for the motor that is associated with the called tap; and (f) transmitting, via the wire harness, the adjusted operating parameter to the motor controller.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any layers or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A programming module for programming a motor controller coupled to a motor, said programming module comprising:
   a connector coupled to a system control wire harness of a system control board;
   a wire harness coupled to a motor connector of the motor controller such that said programming module is serially coupled between the system control board and the motor controller;
   a tap detection circuit coupled to said connector and configured to detect which tap of a plurality of taps of the motor is called by the system control board; and
   a wireless communication device configured to:
      transmit an identification of the called tap wirelessly to a programming computing device;
      receive, from the programming computing device, an adjusted operating parameter for the motor that is associated with the called tap; and
      transmit, via said wire harness, the adjusted operating parameter to the motor controller.

2. The programming module of claim 1, wherein said connector comprises:
   a plurality of power line terminals for receiving power from the system control board; and a plurality of input tap terminals, each associated with a respective system control board operating instruction.

3. The programming module of claim 1, wherein said wire harness comprises:
a plurality of power line terminals for providing power from the system control board to the motor via said programming module; and
a plurality of taps terminals, each associated with a respective system control board operating instruction, each of said plurality of taps terminals configured to provide a respective adjusted operating parameter to the motor controller.

4. The programming module of claim 1, wherein said wireless communication device is configured to wirelessly couple to the programming computing device using a point-to-point wireless connection.

5. The programming module of claim 1, wherein said programming module is powered using input taps on said programming module via the system control wire harness.

6. The programming module of claim 1, wherein said wireless communication device comprises a transceiver.

7. The programming module of claim 1, wherein the adjusted operating parameter includes at least one of torque, speed, airflow, voltage, current, on-delay, off-delay, slew rate, rotation, and motor response timing.

8. The programming module of claim 1, wherein to transmit via said wire harness, the adjusted operating parameter to the motor controller, said programming module is configured to transmit the adjusted operating parameter to the motor controller in substantially real-time while the motor is operating.

9. The programming module of claim 1, said wireless communication device is further configured to store the adjusted operating parameter on a memory device of the motor controller.

10. A method of programming a motor controller coupled to a motor, said method comprising:
coupling a connector of a programming module to a system control wire harness of a system control board;
coupling a wire harness of the programming module to a motor connector of the motor controller such that the programming module is serially coupled between the system control board and the motor controller;
detecting, using a tap detection circuit of the programming module which tap of a plurality of taps of the motor is called by the system control board;
transmitting, by a wireless communication device of the programming module, an identification of the called tap wirelessly to a programming computing device;
receiving, from the programming computing device, an adjusted operating parameter for the motor that is associated with the called tap; and
transmitting, via the wire harness, the adjusted operating parameter to the motor controller.

11. The method of claim 10, further comprising wirelessly coupling the wireless communication device to the programming computing device using a point-to-point wireless connection.

12. The method of claim 10, further comprising generating, by the system control board, a specific tap call that requires the motor to operate.

13. The method of claim 10, further comprising displaying the called tap and at least one operating parameter of the motor associated with the called tap on a mobile application provided on the programming computing device.

14. The method of claim 10, wherein receiving the adjusted operating parameter comprises receiving an adjustment of at least one of torque, speed, airflow, voltage, current, on-delay, off-delay, slew rate, rotation, and motor response timing.

15. The method of claim 10, wherein before coupling the connector to the system control wire harness and coupling the wire harness to the motor connector, said method comprises disconnecting the system control wire harness from the motor connector of the motor.

16. A motor programming system for programming a motor controller coupled to a motor, motor programming system comprising:
a programming module for programming a motor controller coupled to a motor, said programming module comprising:
a connector coupled to a system control wire harness of a system control board;
a wire harness coupled to a motor connector of the motor controller such that said programming module is serially coupled between the system control board and the motor controller;
a tap detection circuit coupled to said connector and configured to detect which tap of a plurality of taps of the motor is called by the system control board; and
a wireless communication device configured to:
wirelessly transmit an identification of the called tap;
receive an adjusted operating parameter for the motor that is associated with the called tap; and
transmit, via said wire harness, the adjusted operating parameter to the motor controller; and
a programming computing device coupled in wireless communication to said programming module, said programming computing device configured to:
receive an adjusted operating parameter input by a user that associated with the called tap; and
wirelessly transmit the adjusted operating parameter to said programming module.

17. The motor programming system of claim 16, wherein said programming computing device is further configured to:
display the identification of the called tap received from said programming module; and
display an operating parameter for the motor that is associated with the called tap.

18. The motor programming system of claim 16, wherein said programming computing device is a transitory device that enables substantially real-time adjustment of motor operational parameters for programming into a non-volatile memory of the motor controller.

19. The motor programming system of claim 16, wherein said programming computing device is configured to implement a mobile application stored on a non-transitory computer-readable medium of said programming computing device, the mobile application including a graphical user interface for inputting motor programming instructions therein to adjust the operating parameter.

20. The motor programming system of claim 16, wherein the adjusted operating parameter includes at least one of torque, speed, airflow, voltage, current, on-delay, off-delay, slew rate, rotation, and motor response timing.

* * * * *